United States Patent
Nakanishi et al.

(10) Patent No.: US 11,164,117 B2
(45) Date of Patent: Nov. 2, 2021

(54) INFORMATION PROCESSING APPARATUS, INFORMATION PROCESSING METHOD AND NON-TRANSITORY STORAGE MEDIUM

(71) Applicant: TOYOTA JIDOSHA KABUSHIKI KAISHA, Toyota (JP)

(72) Inventors: Akihiko Nakanishi, Nisshin (JP); Daigo Fujii, Tsushima (JP); Makoto Tanaka, Toyota (JP); Kazuki Takeuchi, Toyota (JP); Chie Koike, Nagoya (JP); Daiki Kaneichi, Nisshin (JP); Tsuyoshi Okada, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/541,249

(22) Filed: Aug. 15, 2019

(65) Prior Publication Data
US 2020/0065729 A1   Feb. 27, 2020

(30) Foreign Application Priority Data
Aug. 21, 2018   (JP) .............................. JP2018-154769

(51) Int. Cl.
*G06Q 10/06*   (2012.01)
(52) U.S. Cl.
CPC .............. *G06Q 10/06311* (2013.01)
(58) Field of Classification Search
None
See application file for complete search history.

(56) References Cited

U.S. PATENT DOCUMENTS

2015/0324944 A1* 11/2015 Lord ................. G01C 21/3438
                                                   705/7.13
2017/0351987 A1* 12/2017 Liu .................. G06Q 10/06311

FOREIGN PATENT DOCUMENTS

JP   2011-237842 A   11/2011

OTHER PUBLICATIONS

Vehicle Selection Based on Goods, Jan. 2, 2018 (Year: 2018).*

* cited by examiner

*Primary Examiner* — Mohamed N El-Bathy
(74) *Attorney, Agent, or Firm* — Oliff PLC

(57) ABSTRACT

An information processing apparatus according to the present disclosure sets a provisional combination of a driver user and fellow passenger users and acquires attribute information of baggage carried by the fellow passenger users included in the provisional combination. The information processing apparatus transmits the baggage attribute information of baggage carried by the fellow passenger user included in the provisional combination and information inquiring whether or not to agree to the provisional combination to a terminal used by the driver user included in the provisional combination. Upon receiving information indicating agreement to the provisional combination from the terminal of the driver user, the information processing apparatus sets the provisional combination as an official combination.

4 Claims, 10 Drawing Sheets

[Fig. 1]
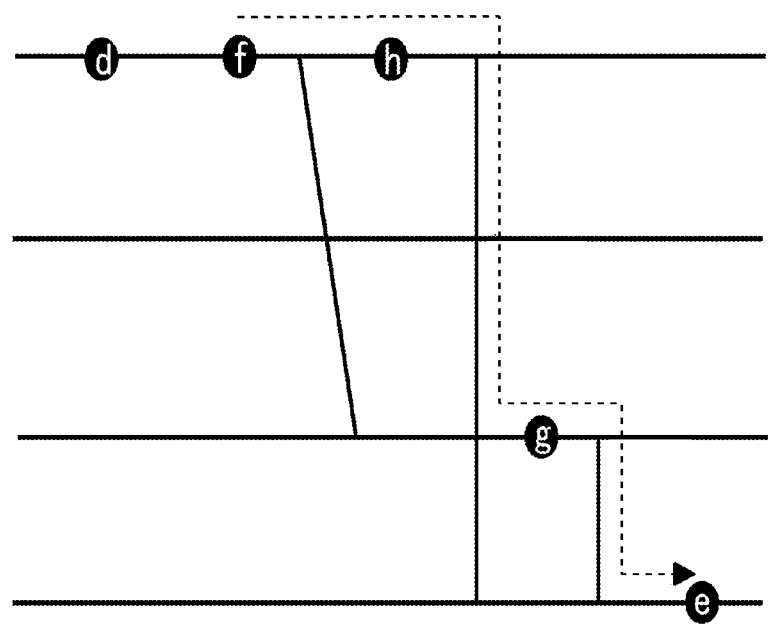

[Fig. 2]
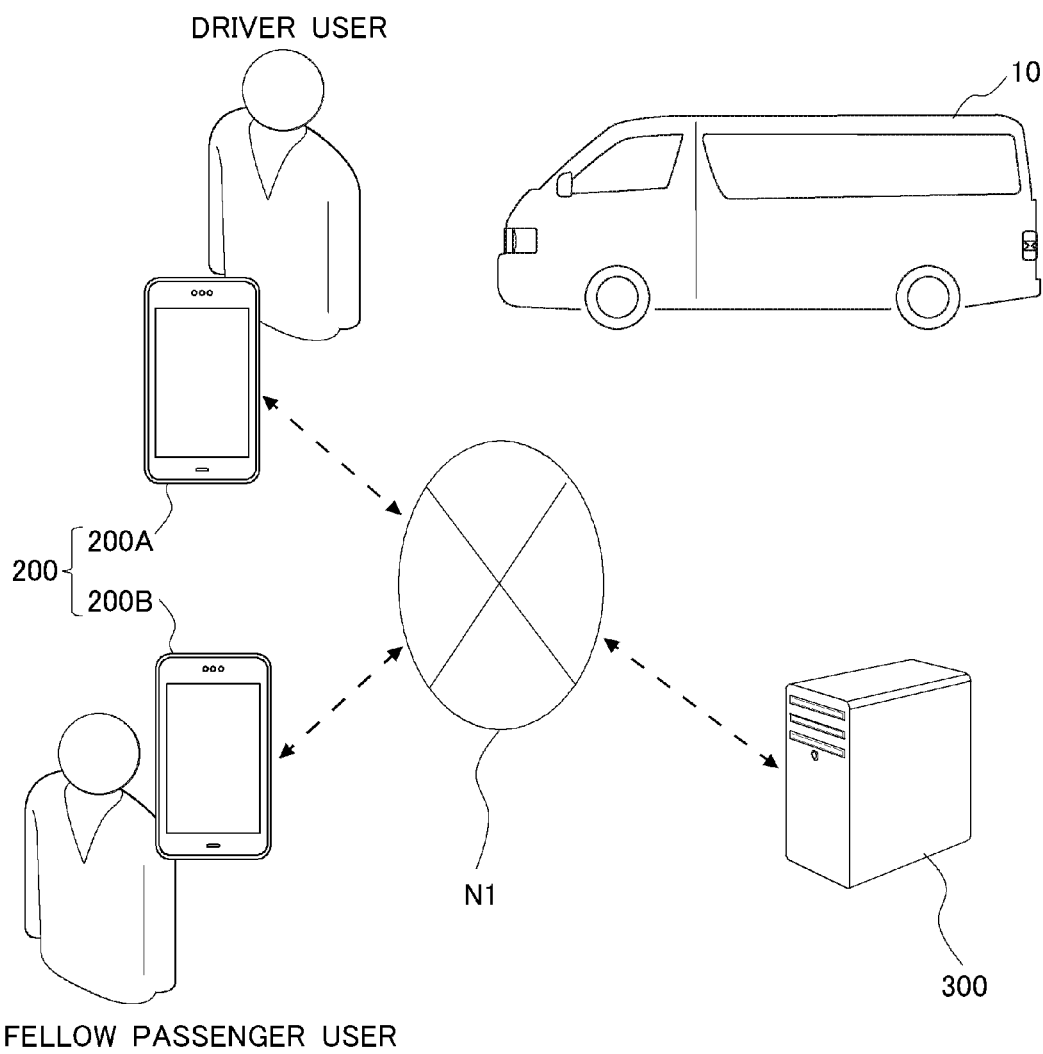

[Fig. 3]
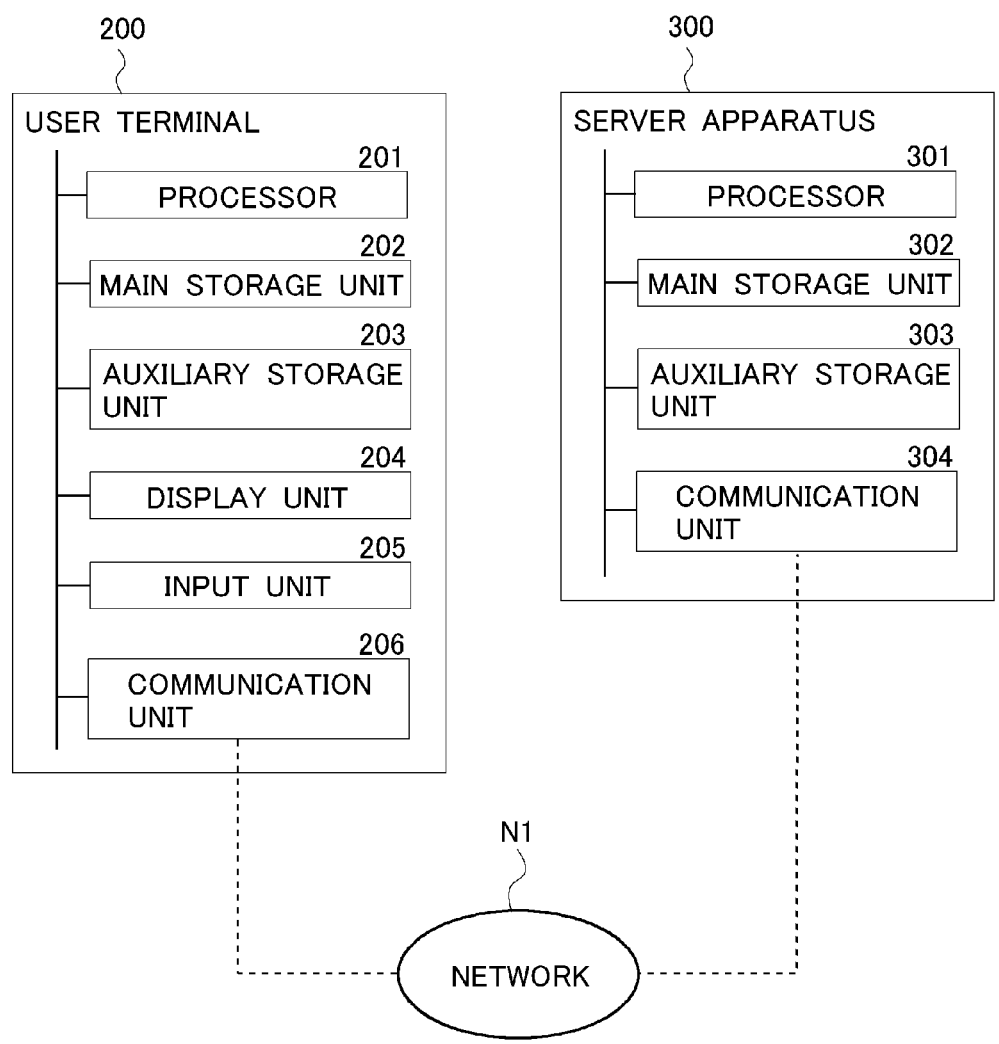

[Fig. 4]
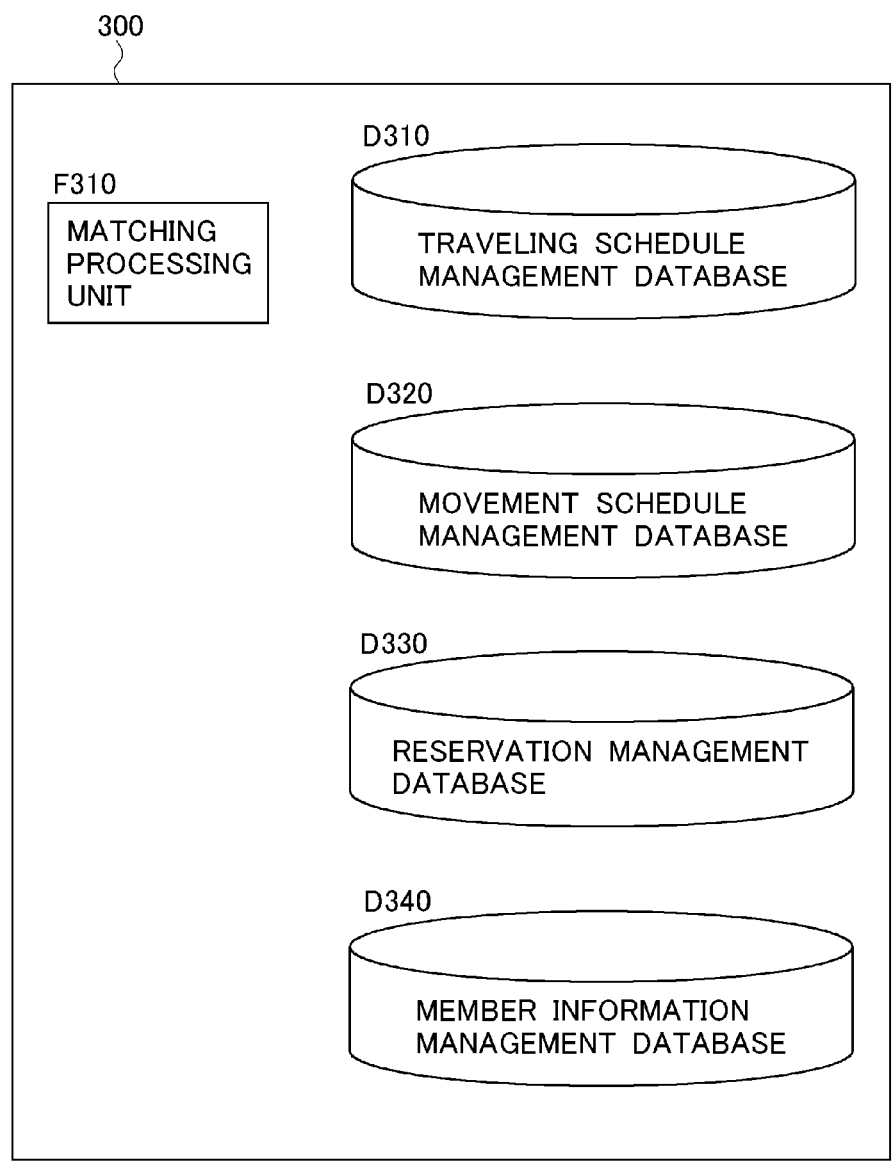

[Fig. 5]

| VEHICLE ID | DRIVING USER ID | PLACE OF DEPARTURE | SCHEDULED DEPARTURE DATE AND TIME | DESTINATION | SCHEDULED ARRIVAL DATE AND TIME | STATUS |
|---|---|---|---|---|---|---|
| S001 | D001 | ... | 2018/11/01/1000 | ... | 2018/11/01/1300 | ALREADY ARRIVED |
| S002 | D002 | ... | 2018/11/05/0800 | ... | 2018/11/05/0900 | TRAVELLING |
| S003 | D003 | ... | 2018/11/08/1000 | ... | 2018/11/08/1600 | BEFORE DEPARTURE |

[Fig. 6]

| FELLOW PASSENGER USER ID | PLACE OF DEPARTURE | DESIRED DEPARTURE DATE AND TIME | DESTINATION | DESIRED ARRIVAL DATE AND TIME | STATUS |
|---|---|---|---|---|---|
| D010 | ... | 2018/11/01/1030 | ... | 2018/11/01/1230 | GOT OFF |
| D020 | ... | 2018/11/05/0815 | ... | 2018/11/05/0845 | RESERVED |
| D030 | ... | 2018/11/08/1200 | ... | 2018/11/08/1430 | MATCHING IN PROGRESS |

[FIG. 7]

| RESERVATION ID | DRIVER USER ID | VEHICLE INFORMATION | FELLOW PASSENGER USER ID | GETTING-ON SPOT | SCHEDULED GETTING-ON DAY AND TIME | GETTING-OFF SPOT | SCHEDULED GETTING-OFF DAY AND TIME | STATUS |
|---|---|---|---|---|---|---|---|---|
| ... | D001 | ... | D010 | ... | 2018/11/01/1000 | ... | 2018/11/01/1300 | GOT OFF |
| ... | D002 | ... | D020 | ... | 2018/11/05/0800 | ... | 2018/11/05/0900 | ON BOARD |
| ... | D003 | ... | D030 | ... | 2018/11/08/1000 | ... | 2018/11/08/1600 | BEFORE RIDING |

[FIG. 8]

| RESERVATION ID | DRIVER USER ID | VEHICLE INFORMATION | FELLOW PASSENGER USER ID | GETTING-ON SPOT | SCHEDULED GETTING-ON DAY AND TIME | GETTING-OFF SPOT | SCHEDULED GETTING-OFF DAY AND TIME | STATUS |
|---|---|---|---|---|---|---|---|---|
| ... | D001 | ... | D010 | ... | 2018/11/01/1000 | ... | 2018/11/01/1300 | ON BOARD |
| | | | D020 | ... | 2018/11/01/1030 | ... | 2018/11/01/1230 | GOT OFF |
| | | | D030 | ... | 2018/11/01/1100 | ... | 2018/11/01/1530 | ON BOARD |

[Fig. 9]

| USER ID | CONTACT ADDRESS | ATTRIBUTE | AUTHENTICATION | VEHICLE ID |
|---|---|---|---|---|
| D001 | ... | ... | ... | S001 |
| D002 | ... | ... | ... | S002 |
| D010 | ... | ... | ... | NONE |

[Fig. 10]
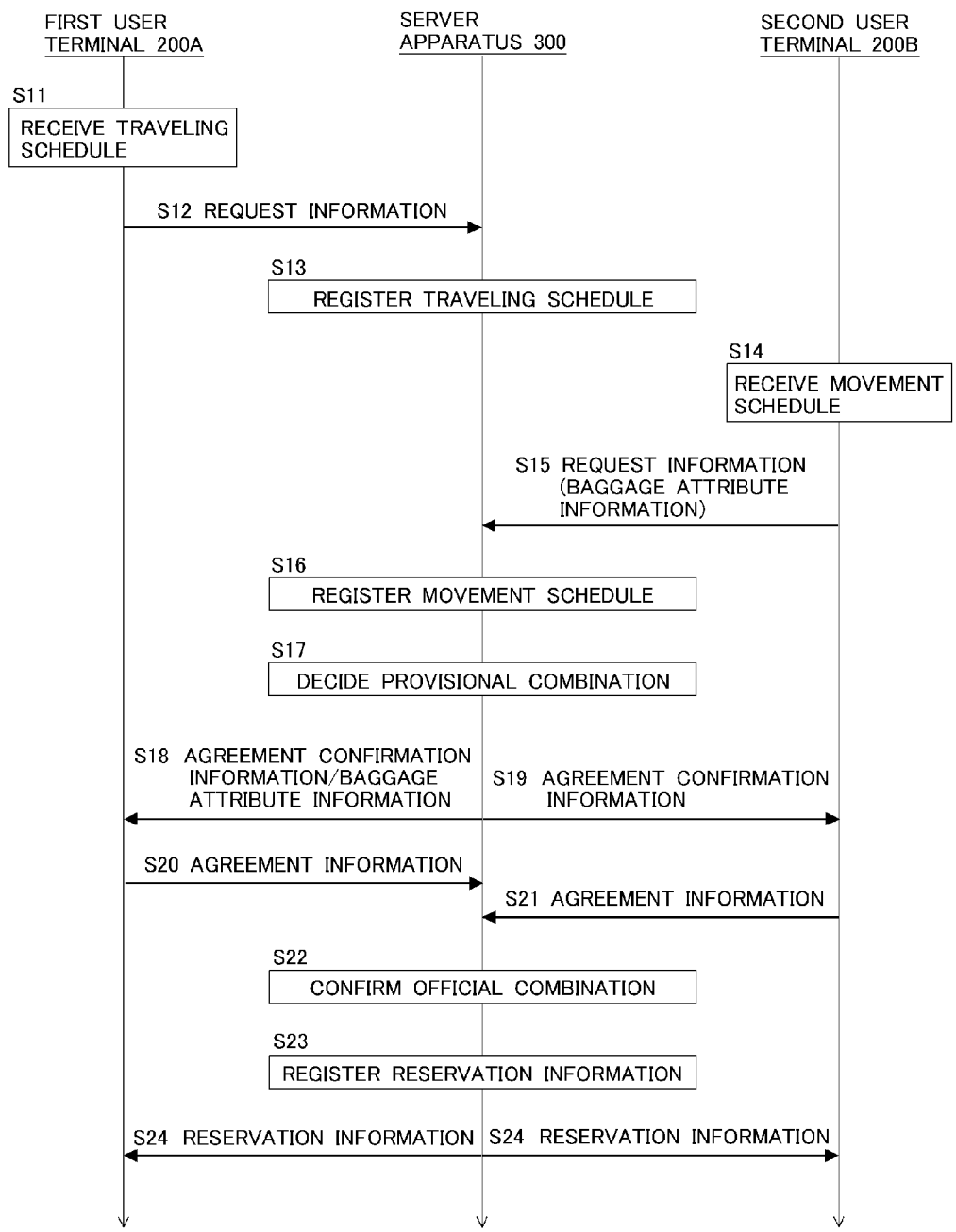

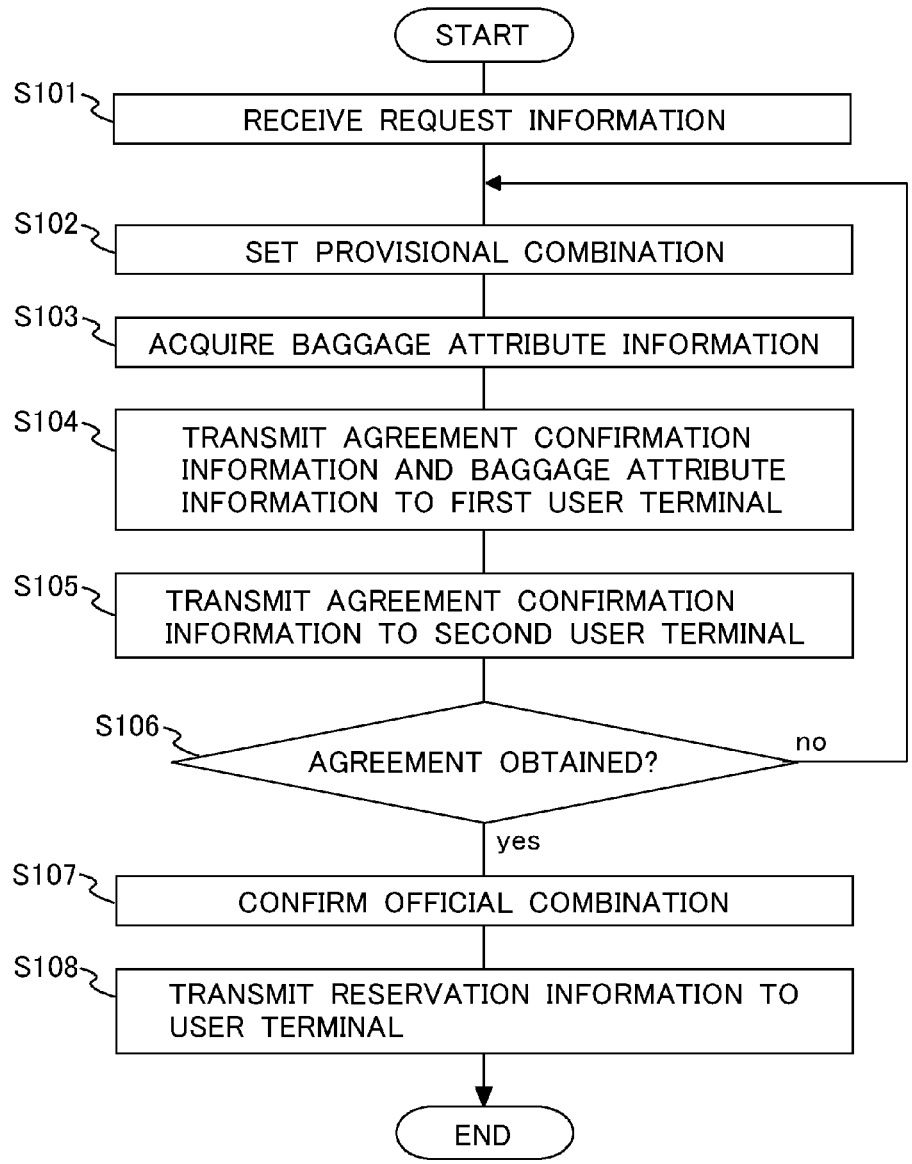
[Fig. 11]

INFORMATION PROCESSING APPARATUS, INFORMATION PROCESSING METHOD AND NON-TRANSITORY STORAGE MEDIUM

CROSS-REFERENCE TO RELATED APPLICATIONS

This application claims the benefit of Japanese Patent Application No. 2018-154769, filed on Aug. 21, 2018 which is hereby incorporated by reference herein in its entirety.

BACKGROUND

Technical Field

The present disclosure relates to an information processing apparatus, an information processing method and a non-transitory storage medium.

Description of the Related Art

Techniques for determining whether or not owners of terminals are sharing the same vehicle based on position information of the respective terminals and calculating environment loads such as $CO_2$ emission and fuel consumption based on the determination result are known (e.g., see Patent Literature 1).

CITATION LIST

Patent Literature

Patent Literature 1: Japanese Patent Application Laid-Open No. 2011-237842

SUMMARY

It is an object of the present disclosure to provide a technique capable of preventing inappropriate combinations of a driver user who drives a vehicle and fellow passenger users who ride in the same vehicle from being set in ride sharing in which a plurality of users share the same vehicle for traveling.

The present disclosure is an information processing apparatus in a mode in which a plurality of users share the same vehicle, that sets a combination of a driver user who drives the vehicle and fellow passenger users who ride in the same vehicle. Such an information processing apparatus is provided with a controller including at least one processor. The controller is configured to execute: setting a provisional combination of the driver user and the fellow passenger users; acquiring baggage attribute information which is information indicating an attribute of baggage carried by the fellow passenger users included in the provisional combination; transmitting the baggage attribute information of baggage carried by the fellow passenger users included in the provisional combination and information inquiring whether or not to agree to the provisional combination to a terminal used by the driver user included in the provisional combination; and setting the provisional combination as an official combination when information indicating agreement to the provisional combination is received from the terminal used by the driver user included in the provisional combination.

The present disclosure can also be considered as an information processing method in a mode in which a plurality of users share the same vehicle for setting a combination of a driver user who drives the vehicle and fellow passenger users who ride in the same vehicle. The information processing method in that case may be constituted so as to cause a computer to execute: a step of setting a provisional combination of the driver user and the fellow passenger users; a step of acquiring baggage attribute information which is information indicating an attribute of baggage carried by the fellow passenger users included in the provisional combination; a step of transmitting the baggage attribute information of baggage carried by the fellow passenger users included in the provisional combination and information inquiring whether or not to agree to the provisional combination to a terminal used by the driver user included in the provisional combination; and a step of setting the provisional combination as an official combination when information indicating agreement to the provisional combination is received from the terminal used by the driver user included in the provisional combination.

The present disclosure can also be considered as an information processing program or a non-transitory storage medium storing the information processing program for setting a combination of a driver user who drives the vehicle and fellow passenger users who ride in the same vehicle. The information processing program in that case may be constituted so as to cause a computer to execute: a step of setting a provisional combination of the driver user and the fellow passenger users; a step of acquiring baggage attribute information which is information indicating an attribute of baggage carried by the fellow passenger users included in the provisional combination; a step of transmitting the baggage attribute information of baggage carried by the fellow passenger users included in the provisional combination and information inquiring whether or not to agree to the provisional combination to a terminal used by the driver user included in the provisional combination; and a step of setting the provisional combination as an official combination when information indicating agreement to the provisional combination is received from the terminal used by the driver user included in the provisional combination.

According to the present disclosure, it is possible to prevent inappropriate combinations of a driver user who drives a vehicle and fellow passenger users who ride in the same vehicle from being set in ride sharing in which a plurality of users share the same vehicle for traveling.

BRIEF DESCRIPTION OF THE DRAWINGS

FIG. 1 is a diagram for describing an overview of ride-sharing;

FIG. 2 is a diagram illustrating a schematic configuration of a ride-sharing system;

FIG. 3 is a diagram illustrating a hardware configuration of a user terminal and a server apparatus;

FIG. 4 is a block diagram illustrating a functional configuration of the server apparatus;

FIG. 5 is a diagram illustrating a configuration example of a traveling schedule information table;

FIG. 6 is a diagram illustrating a configuration example of a movement schedule information table;

FIG. 7 is a diagram illustrating a configuration example of a reservation information table;

FIG. 8 is a diagram illustrating another configuration example of the reservation information table;

FIG. 9 is a diagram illustrating a configuration example of a member information table;

FIG. 10 is a flowchart illustrating an overview of a flow of data transmitted/received among respective components of a ride sharing system and a flow of processes carried out by the respective components; and FIG. 11 is a flowchart illustrating operation of the server apparatus when the server apparatus receives request information from the user terminal.

DESCRIPTION OF THE EMBODIMENTS

The present disclosure is an information processing apparatus that sets a combination of a driver user who drives a vehicle and fellow passenger users who ride in the same vehicle in a mode in which a plurality of users share the same vehicle (ride sharing).

Here, in the above-described ride sharing, the fellow passenger users may carry baggage. If the size of baggage carried by the fellow passenger users is larger than a loadable space of the vehicle used for the ride sharing, the baggage is unable to be loaded into the vehicle, and so it is difficult to allow the fellow passenger user to ride in the vehicle. In addition, after the vehicle driven by the driver user arrives at a getting-in spot of the fellow passenger user, if it is revealed that the size of the baggage carried by the fellow passenger user is larger than the loadable space of the vehicle, the effort made by the driver user who has driven the vehicle up to the getting-in spot may be wasted or convenience of the fellow passenger user may be reduced. Furthermore, when an attempt is made to allow a first fellow passenger user and a second fellow passenger user to ride in one vehicle, if baggage of the first fellow passenger user who has got in the vehicle first is relatively large, there may be not enough space to load the vehicle with the baggage of the second fellow passenger user who tries to get in the vehicle later, and so it may be difficult to allow the second fellow passenger user to get in the vehicle. The effort of the driver user who has driven the vehicle up to the getting-in spot of the second fellow passenger user may be wasted or convenience of the second fellow passenger user may be reduced in that case, too.

Furthermore, when the baggage carried by the fellow passenger user is of a type that the driver user does not want to carry on his/her own vehicle (the type of baggage with which the driver is physically or mentally unfamiliar or the type of baggage that may cause the vehicle to be soiled), if the type of the baggage carried by the fellow passenger user is revealed after the vehicle driven by the driver user arrives at the getting-in spot of the fellow passenger user, it may be difficult for the driver user to refuse riding of the fellow passenger user in the vehicle, or even if the driver user can refuse riding of the fellow passenger user in the vehicle, the effort of the driver user who has driven the vehicle to the getting-in spot may be wasted. Furthermore, when an attempt is made to allow a first fellow passenger user and a second fellow passenger user to ride in one vehicle, if baggage of the first fellow passenger user and baggage of the second fellow passenger user are pets such as animals, such animals may be incompatible with each other, which may cause the atmosphere in the vehicle to get worse.

Thus, when setting a combination of the driver user and the fellow passenger users, the controller in the information processing apparatus according to the present disclosure sets a provisional combination of the driver user and the fellow passenger users and acquires attribute information of the baggage carried by the fellow passenger users included in the provisional combination (baggage attribute information). Next, the controller transmits the baggage attribute information of the baggage carried by the fellow passenger user included in the provisional combination and information inquiring whether or not to agree to the provisional combination to the terminal used by the driver user included in the provisional combination. When the information indicating agreement to the provisional combination is received from the terminal of the driver user, the controller sets the provisional combination as an official combination.

According to the information processing apparatus of the present disclosure, the driver user included in the provisional combination uses the baggage attribute information of the baggage carried by the fellow passenger users included in the provisional combination as a reference, and can thereby grasp attributes of baggage of all the fellow passenger users included in the provisional combination in advance. In this way, the driver user can determine whether or not to agree to the provisional combination in consideration of not solely whether or not to allow the fellow passenger users himself/herself to ride in the vehicle driven by himself/herself but also whether or not to allow the baggage carried by the fellow passenger users to be loaded into the vehicle. As a result, it is possible to prevent the driver user from being combined with fellow passenger users carrying baggage unable to be physically mounted on the vehicle driven by himself/herself or with fellow passenger users carrying baggage not desirable to be loaded into the vehicle driven by himself/herself. Therefore, it is possible to prevent inappropriate combinations of the driver user and fellow passenger users from being set in ride sharing.

The "baggage attribute information" referred to here may also include information indicating, for example, a size and a type of baggage. In such a case, the driver user included in the provisional combination refers to the baggage attribute information, and can thereby grasp the size and type of baggage of all the fellow passenger users included in the provisional combination in advance, and can thereby determine whether or not the baggage in that size can be loaded into the loadable space of the vehicle driven by himself/herself or whether or not the baggage is desirable to be loaded into the vehicle driven by himself/herself.

Note that when it is not possible to receive the information indicating agreement to the provisional combination from the terminal of the driver user included in the provisional combination, the controller may reset a new provisional combination of the driver user and fellow passenger users different from the provisional combination. This makes it possible to prevent any combinations not desired by the driver user from being set.

Hereinafter, specific embodiments of the present disclosure will be described based on the accompanying drawings. Dimensions, materials, shapes, and other relative arrangements or the like of components described in the present embodiments are not intended to limit the technical scope of the present disclosure to those embodiments unless specified otherwise.

Embodiment

An example will be described in the present embodiment where the present disclosure is implemented in a mode in which a plurality of users intended for traveling share the same vehicle (hereinafter referred to as "ride-sharing"). Note that automobiles and trains or the like can be used as vehicles that can be shared among a plurality of users for a traveling purpose. A case will be described in the present embodiment where an automobile is used as an example of such vehicles.

(Overview of Ride-Sharing)

First, an overview of ride-sharing will be described based on FIG. 1. In an example shown in FIG. 1, suppose that a user A travels from the point d to the point e, a user B travels from the point f to the point g and a user C travels from the point h to the point e.

Here, if the users A to C travel separately in their respective vehicles, three vehicles are necessary. In contrast, when the users A to C share one vehicle, the respective users can travel to their destinations in the one vehicle. In the example shown in FIG. 1, the user A himself/herself drives a vehicle and travels from the point d to the point e. At this time, the user A allows the user B to get in the vehicle driven by the user A at the point f, and allows the user C to get in the vehicle driven by the user A at the point h. On the way to the point e which is the destination of the user A and the user C, the user A travels via the point g, where the user B gets off the vehicle, thus allowing the user B to travel from the point f to the point g. After that, the user A drives the vehicle from the point g to the point e to thereby allow the user C to travel from the point h to the point e, and at the same time the user A himself/herself can attain the traveling of the user A.

Such ride-sharing can reduce the number of vehicles traveling on a road, and can thereby relax traffic jam. Furthermore, since a plurality of users who share the same vehicle share transportation expenses (fuel expenses or the like) necessary for traveling in the vehicle, it is possible to cut down on a transportation cost per user compared to a case where each user travels in an individual vehicle.

Note that the aspect of the ride sharing illustrated in FIG. 1 is merely an example and a combination of the user who drives the vehicle used for the ride sharing (driver user) and users who ride in the same vehicle (fellow passenger users), a traveling route of the vehicle used for the ride sharing or the like can be set using various methods. However, if a combination of the driver user and fellow passenger users is set without taking attributes (size, type or the like) of baggage carried by the fellow passenger users into consideration, a fellow passenger user carrying baggage unable to physically be loaded into the vehicle or a fellow passenger user carrying baggage not desirable to be loaded into the vehicle may be inappropriately combined with the driver user of the vehicle.

Thus, in the present embodiment, a server apparatus for performing information processing relating to operation and management of a ride sharing service provides attribute information of baggage carried by the fellow passenger user included in the provisional combination (baggage attribute information) to the driver user included in the provisional combination when inquiring of the driver user whether or not to agree to the provisional combination at the time of setting the provisional combination of the driver user and fellow passenger users. Accordingly, the driver user included in the provisional combination uses baggage attribute information of baggage carried by all the fellow passenger users included in the provisional combination as a reference, and can thereby grasp sizes, types or the like of baggage of all the fellow passenger users in advance and determine whether or not to agree to the provisional combination. As a result, it is possible to prevent the driver user from being inappropriately combined with a fellow passenger user carrying baggage unable to physically be loaded into the vehicle driven by himself/herself or a fellow passenger user carrying baggage not desirable to be loaded into the vehicle driven by himself/herself.

(System Configuration)

FIG. 2 is a diagram illustrating a configuration example of a system for providing a ride-sharing service (hereinafter may also be referred to as a "ride-sharing system"). In the example shown in FIG. 2, the ride-sharing system is constructed of a vehicle 10 used for ride sharing, a user terminal 200 used by a user sharing the vehicle 10 and a server apparatus 300. The user terminal 200 and the server apparatus 300 are mutually connectable via a network N1. A WAN (Wide Area Network) which is a worldwide public communication network such as the Internet or other communication networks may be adopted for the network N1. The network N1 may include a telephone communication network such as mobile phones or a wireless communication network such as Wi-Fi (registered trademark).

Note that although only one vehicle 10 is illustrated in the example shown in FIG. 2 as the vehicle available for the ride-sharing service, suppose that the ride-sharing system includes a number of vehicles registered as vehicles available for the ride-sharing service. As the user terminals 200, the example illustrated in FIG. 2 illustrates solely two terminals: a user terminal 200A used by a user (driver user) who drives the vehicle 10 used for ride sharing (hereinafter referred to as a "first user terminal 200A") and a user terminal 200B used by users (fellow passenger users) who ride in the vehicle 10 driven by the driver user other than the fellow passenger users (hereinafter referred to as a "second user terminal 200B"), but suppose that the ride-sharing system includes a number of user terminals corresponding to the number of users registered as members entitled to use the ride-sharing service.

A predetermined application for using a ride-sharing service is installed in each user terminal 200. The user of the user terminal 200 causes the own user terminal 200 to execute the above predetermined application, and can thereby register information relating to conditions or the like when sharing a vehicle (hereinafter may also be referred to as "request information") in the server apparatus 300. For example, the driver user causes the first user terminal 200A to execute the above-described predetermined application, and can thereby register information relating to the own scheduled traveling section of the vehicle 10 and the traveling date and time or the like (traveling schedule) in the server apparatus 300 as request information. The fellow passenger user causes the second user terminal 200B to execute the above-described predetermined application, and can thereby register information relating to the own desired movement section and movement date and time or the like (movement schedule) in the server apparatus 300 as request information.

The server apparatus 300 receives the request information from the driver user and the request information from the fellow passenger user. The server apparatus 300 sets a provisional combination of a driver user and a fellow passenger user based on the request information from the driver user and the request information from the fellow passenger user. In that case, the number of fellow passenger users to be combined with one driver user need not be one but can be plural. The server apparatus 300 acquires baggage attribute information of baggage carried by the fellow passenger user included in the provisional combination and transmits the acquired baggage attribute information and information inquiring whether or not to agree to the provisional combination to the first user terminal 200A of the driver user. The "baggage attribute information" referred to here includes information indicating the size and type of baggage carried by the fellow passenger users when using a ride sharing service. A method of acquiring such baggage attribute information will be described later. Upon receiving the information indicating agreement to the provisional combination from the first user terminal 200A of the driver user, the server apparatus 300 confirms the provisional combination as an official combination. Note that upon transmitting the baggage attribute information and the information inquiring whether or not to agree to the provisional combination to the first user terminal 200A of the driver user, the server apparatus 300 may transmit solely the information inquiring whether or not to agree to the provisional combination to the second user terminal 200B of the fellow passenger user. In that case, the server apparatus 300 may confirm the provisional combination as the official combination on condition that the information indicating agreement to the provisional combination is received from both the first user terminal 200A of the driver user and the second user terminal 200B of the fellow passenger users included in the provisional combination. Hereinafter, a process for the server apparatus 300 to confirm a combination of a driver user and a fellow passenger user using the above procedure will be referred to as a "matching process." Note that in the present embodiment, the server apparatus 300 that performs the above-described matching processing corresponds to the "information processing apparatus" of the present disclosure.

(Hardware Configuration)

FIG. 3 is a diagram illustrating a hardware configuration of each of the user terminal 200 and the server apparatus 300. Note that the first user terminal 200A and the second user terminal 200B shown in aforementioned FIG. 2 each have a hardware configuration similar to the configuration of the user terminal 200 in FIG. 3.

The server apparatus 300 has a configuration of a general computer. That is, the server apparatus 300 includes a processor 301, a main storage unit 302, an auxiliary storage unit 303 and a communication unit 304. These components are mutually connected via a bus. The main storage unit 302 and the auxiliary storage unit 303 are computer-readable storage media. The hardware configuration of the computer is not limited to the configuration example shown in FIG. 3, but components may be omitted, replaced or added as appropriate.

The server apparatus 300 implements functions matching to a predetermined object by the processor 301 loading a work region of the main storage unit 302 with a program stored in the storage medium and executing the program, and controlling the respective function components through execution of the program.

The processor 301 is, for example, a CPU (Central Processing Unit) or a DSP (Digital Signal Processor). The processor 301 controls the server apparatus 300 and performs operations of various kinds of information processing. The main storage unit 302 includes, for example, a RAM (Random Access Memory) and a ROM (Read Only Memory). The auxiliary storage unit 303 is, for example, an EPROM (Erasable Programmable ROM) or a hard disk drive (HDD). Furthermore, the auxiliary storage unit 303 can include a removable medium, that is, a removable storage medium. The removable medium is a disk storage medium such as a USB (Universal Serial Bus) memory, a CD (Compact Disc) or a DVD (Digital Versatile Disc).

The auxiliary storage unit 303 stores various programs, various kinds of data and various tables in a storage medium in a freely readable/writable state. The auxiliary storage unit 303 stores an operating system (OS), various programs and various tables or the like. Note that a part or a whole of these pieces of information may also be stored in the main storage unit 302. Information stored in the main storage unit 302 may be stored in the auxiliary storage unit 303.

The communication unit 304 transmits/receives information between an external apparatus and the server apparatus 300. The communication unit 304 is, for example, a LAN (Local Area Network) interface board or a wireless communication circuit for wireless communication. The LAN interface board or wireless communication circuit is connected to a network N1.

A series of processes executed by the server apparatus 300 configured as described above may be executed by hardware or may also executed by software.

Next, the user terminal 200 is a small computer that can be carried by the user such as a smartphone, a mobile phone, a tablet terminal, a personal information terminal, a wearable computer (smart watch or the like). Note that the user terminal 200 may also be a personal computer (PC) connected to the server apparatus 300 via the network N1 such as the Internet which is a public communication network.

The user terminal 200 includes a processor 201, a main storage unit 202, an auxiliary storage unit 203, a display unit 204, an input unit 205 and a communication unit 206. Since the processor 201, the main storage unit 202 and the auxiliary storage unit 203 are similar to the processor 301, the main storage unit 302 and the auxiliary storage unit 303 of the server apparatus 300, description thereof is omitted. The display unit 204 is, for example, an LCD (Liquid Crystal Display) or an EL (Electroluminescence) panel. The input unit 205 includes, for example, a touch panel that allows symbols such as characters to be inputted, push buttons, a microphone that allows voice to be inputted or a camera that allows a moving image or still image to be picked up. The communication unit 206 is a communication circuit for accessing the network N1 using, for example, a mobile communication service (telephone communication network such as a mobile phone or wireless communication of WiFi or the like) and carrying out data communication with the server apparatus 300 or the like.

(Functional Configuration of Server Apparatus)

Here, a functional configuration of the server apparatus 300 will be described based on FIG. 4. As shown in FIG. 4, the server apparatus 300 of the present embodiment includes, as functional components thereof, a matching processing unit F310, a traveling schedule management database D310, a movement schedule management database D320 and a reservation management database D330. Here, the matching processing unit F310 is formed by the processor 301 of the server apparatus 300 executing a computer program in the main storage unit 302. Note that part of the matching processing unit F310 may be formed of a hardware circuit.

The traveling schedule management database D310, the movement schedule management database D320, the reservation management database D330 and a member information management database D340 are constructed by a program of a database management system (DBMS) executed by the processor 301 of the server apparatus 300 managing data stored in the auxiliary storage unit 303. These traveling schedule management database D310, movement schedule management database D320, reservation management database D330 and member information management database D340 are, for example, relational databases.

Note that any one or part of processing thereof of the respective functional components of the server apparatus 300 may be executed by another computer connected to the network N1. For example, each process included in the matching processing unit F310 may be executed by different computers.

The traveling schedule management database D310 stores a traveling schedule of each vehicle 10, where identification information of a driver user of the vehicle 10 is associated with a traveling schedule of the vehicle 10. Here, a configuration example of traveling schedule information stored in the traveling schedule management database D310 will be described based on FIG. 5. FIG. 5 is a diagram illustrating a table configuration of traveling schedule information. Note that information registered in the traveling schedule information table is not limited to the example shown in FIG. 5, but fields may be added, changed or deleted as appropriate.

The traveling schedule information table shown in FIG. 5 includes fields such as a vehicle ID, a driver user ID, a place of departure, a scheduled date and time of departure, a destination, a scheduled date and time of arrival, and a status. A vehicle ID which is information for identifying each vehicle 10 available for ride sharing is registered in the vehicle ID field. The vehicle ID referred to here is information assigned together with a user ID which will be described later when a driver user of each vehicle 10 applies for membership registration for a ride-sharing service, and is information for identifying each vehicle 10. A certain user ID which is information for identifying a driver user of each vehicle 10 available for ride sharing is registered in the driver user ID field. The user ID is information assigned when a driver user of the vehicle 10 available for ride sharing applies for membership registration for a ride-sharing service. Information indicating a place of departure of the vehicle 10 available to each driver user for ride sharing is registered in the place of departure field. Note that the place of departure referred to here is not limited to a place where the driver user starts traveling in the vehicle 10, but can be changed by the driver user according to his/her convenience as appropriate. Information indicating a scheduled date and time of departure at which the driver user leaves the above place of departure in the vehicle 10 driven by the driver user is registered in the scheduled date and time of departure field. Information indicating a destination for which the driver user is heading in the vehicle 10 available for ride sharing is registered in the destination field. Note that the destination referred to here is not limited to a place where the driver user's traveling in the vehicle 10 ends, but can be changed according to the convenience of the driver user as appropriate. Information indicating a scheduled date and time at which the driver user traveling in the vehicle 10 driven by the driver user arrives at the above destination is registered in the scheduled date and time of arrival field. Information indicating a traveling situation of the vehicle 10 driven by the driver user is registered in the status field. For example, the status is registered as "already arrived" when the vehicle 10 driven by the driver user has already arrived at the destination, and the status is registered as "traveling" when the vehicle 10 driven by the driver user is traveling from the place of departure to the destination, and the status is registered as "before departure" when the vehicle 10 driven by the driver user has not departed from the place of departure yet. Note that for the vehicle 10 registered as "traveling" in the above status field, information relating to the current position of the vehicle 10 may also be registered in the status field. A current position of the vehicle 10 in that case may be acquired by the server apparatus 300 through communication with the user terminal 200 of the driver user or may be acquired by the server apparatus 300 through communication with a device mounted on the vehicle 10 enabled to communicate.

The movement schedule management database D320 stores a movement schedule of a fellow passenger user who wants ride sharing of an arbitrary vehicle 10, where identification information of the fellow passenger user is associated with the movement schedule. Here, one configuration example of the movement schedule information stored in the movement schedule management database D320 will be described based on FIG. 6. FIG. 6 is a diagram illustrating a table configuration of the movement schedule information. Note that the information registered in the movement schedule information table is not limited to the example shown in FIG. 6, but fields can be added, changed or deleted as appropriate.

The movement schedule information table shown in FIG. 6 includes fields such as a fellow passenger user ID, a getting-in spot, a desired getting-in date and time, a getting-off spot, a desired getting-off date and time, a baggage attribute information and a status. A user ID for identifying each fellow passenger user is registered in the fellow passenger user ID field. The user ID of the fellow passenger user is information assigned when the fellow passenger user applies for membership registration for a ride-sharing service as in the case of the aforementioned driver user ID. Information indicating a place at which each fellow passenger user wants to get in the vehicle 10 available for ride sharing is registered in the getting-in spot field. Information indicating a date and time on which each fellow passenger user wants to get in the vehicle 10 available for ride sharing in the getting-in spot is registered in the desired getting-in date and time field. Information indicating a place at which each fellow passenger user wants to get off the vehicle 10 available for ride sharing is registered in the getting-off spot field. Information indicating a date and time at which each fellow passenger user wants to get off the vehicle 10 available for ride sharing in the getting-off spot is registered in the desired getting-off date and time field. Baggage attribute information which is information indicating attributes of baggage carried by the fellow passenger users when getting in the vehicle 10 available for ride sharing is registered in the baggage attribute information field. The baggage attribute information in the present example is information indicating the size of the baggage carried by the fellow passenger users and information indicating the type of the baggage (e.g., suitcase, briefcase, sporting goods, tools, bicycle, stroller, pet, and plant). Information indicating a traveling situation of the fellow passenger user is registered in the status field. For example, the status is registered as "already got off" when the fellow passenger user has already gotten off the vehicle 10 available for ride sharing, the status is registered as "reserved" when a driver user to be combined with a fellow passenger user is confirmed but the fellow passenger user has not yet got on the vehicle 10 driven by the driver user, and the status is registered as "matching in progress" when a driver user to be combined with a fellow passenger user is not confirmed yet.

The reservation management database D330 stores reservation information for a ride-sharing service, where information relating to the driver user is associated with information relating to a fellow passenger user scheduled to share the vehicle 10 driven by the driver user. Here, one configuration example of reservation information stored in the reservation management database D330 will be described based on FIG. 7. FIG. 7 is a diagram illustrating a table configuration of reservation information. Note that information registered in the reservation information table is not limited to the example shown in FIG. 7, but fields can be added, changed or deleted as appropriate.

The reservation information table shown in FIG. 7 includes fields such as a reservation ID, a driver user ID, a vehicle information, a fellow passenger user ID, a getting-on spot, a scheduled getting-on date and time, a getting-off spot, a scheduled getting-off date and time, a baggage attribute information and a status. A reservation ID which is information for identifying individual reservation information is registered in the reservation ID field. For example, this reservation ID is used when each user confirms or changes reservation contents. A user ID of a driver user driving the vehicle 10 that is used for ride sharing is registered in the driver user ID field. Information necessary for a fellow passenger user who shares the vehicle 10 to identify the vehicle 10 driven by each driver user is registered in the vehicle information field. For example, information such as vehicle model, automobile registration number (number displayed on the number plate), vehicle body color or the like is registered in the vehicle information field. A user ID of a fellow passenger user scheduled to share the vehicle 10 driven by each driver user is registered in the fellow passenger user ID field. Information indicating a place where a fellow passenger user is allowed to get on the vehicle 10 driven by each driver user (getting-on spot) is registered in the getting-on spot field. Information indicating a scheduled date and time at which a fellow passenger user is allowed to get on the vehicle 10 driven by each driver user at the above getting-on spot is registered in the scheduled getting-on date and time field. Information indicating a place where a fellow passenger user is allowed to get off the vehicle 10 driven by each driver user (getting-off spot) is registered in the getting-off spot field. Information indicating a scheduled date and time at which a fellow passenger user is allowed to get off the vehicle 10 driven by each driver user at the above getting-off spot is registered in the scheduled getting-off date and time field. The baggage attribute information of the baggage carried when each fellow passenger user gets in the vehicle 10 is registered in the baggage attribute information field. Information indicating a ride sharing situation of each vehicle 10 is registered in the status field. For example, the status is registered as "already got off" when the fellow passenger user has already got off the vehicle 10 at the above getting-off spot, the status is registered as "getting on" when the fellow passenger user is sharing the vehicle 10 and the status is registered as "before getting on" in a stage before the fellow passenger user gets on the vehicle 10.

The reservation information table in FIG. 7 corresponds to a table configuration example when one fellow passenger user shares the vehicle 10 driven by each driver user, but the number of fellow passenger users who share the vehicle 10 driven by each driver user may be two or more. In that case, as shown in FIG. 8, one driver user ID may be associated with information of a plurality of fellow passenger users.

The member information management database D340 stores information on users registered as members in the ride-sharing service (member information). Here, one configuration example of member information stored in the member information management database D340 will be described based on FIG. 9. FIG. 9 is a diagram illustrating a table configuration of member information. Note that information registered in the member information table is not limited to the example shown in FIG. 9, but fields can be added, changed or deleted as appropriate.

The member information table shown in FIG. 9 includes fields such as a user ID, a contact address, an attribute, authentication and a vehicle ID. A user ID assigned when each user applies for member registration for a ride-sharing service is registered in the user ID field. Information indicating a contact address of each user (e.g., electronic mail address, telephone number, or the like, including at least an electronic mail address of the user terminal 200 used by each user) is registered in the contact field. Information indicating an attribute of each user (e.g., name, nickname, age, gender, occupation, work place (school), hobby, skill or the like) is registered in the attribute field. Information indicating a password or the like necessary for authentication when the aforementioned request information is registered in the server apparatus 300 or when the aforementioned reservation information is confirmed is registered in the authentication field. A vehicle ID of the vehicle 10 available to each user for ride sharing is registered in the vehicle ID field. Note that, for example, "None" is registered in the vehicle ID field for a user not possessing the vehicle 10 available for ride sharing.

Next, the matching processing unit F310 performs a matching process based on request information from a driver user or a fellow passenger user. More specifically, when the server apparatus 300 receives request information (information including vehicle ID, driver user ID, place of departure, scheduled departure date and time, destination and scheduled arrival date and time) transmitted from the first user terminal 200A of the driver user, the matching processing unit F310 generates a traveling schedule information table as illustrated in aforementioned FIG. 5 based on the request information and registers it in the traveling schedule management database D310. On the other hand, when the server apparatus 300 receives request information (information including fellow passenger user ID, desired getting-in spot, desired getting-in date and time, desired getting-off spot, desired getting-off date and time, baggage attribute information) transmitted from the second user terminal 200B of the fellow passenger user, the matching processing unit F310 generates a movement schedule information table as illustrated in aforementioned FIG. 6 based on the request information and registers the generated movement schedule information table in the movement schedule management database D320. The matching processing unit F310 compares the traveling schedule information table of each driver user with the movement schedule information table of each fellow passenger user and extracts a traveling schedule information table in which a traveling schedule that matches the movement schedule of the fellow passenger user is registered. Next, the matching processing unit F310 provisionally combines the driver user associated with the extracted traveling schedule information table with the above-described fellow passenger user. Note that the method of setting a provisional combination by the matching processing unit F310 is not limited to the above-described method, but matching processing may be performed using other methods using known techniques.

When the provisional combination of the driver user and fellow passenger users is set, the matching processing unit F310 acquires baggage attribute information of the baggage carried by the fellow passenger users included in the above-described provisional combination. For example, the matching processing unit F310 accesses the movement schedule information table of the fellow passenger users included in the provisional combination and reads the baggage attribute information registered in the baggage attribute information field of the movement schedule information table. Next, the matching processing unit F310 transmits the baggage attribute information of the baggage carried by the fellow passenger user included in the provisional combination and information inquiring whether or not to agree to the provisional combination to the first user terminal 200A used by the driver user included in the provisional combination. Furthermore, in the present example, the matching processing unit F310 transmits solely the information inquiring whether or not to agree to the provisional combination to the second user terminal 200B used by the fellow passenger users included in the provisional combination. Note that the information inquiring whether or not to agree to the provisional combination includes information indicating ride sharing conditions with the above-described provisional combination (e.g., getting-in spot of the fellow passenger user, scheduled getting-in date and time of the fellow passenger user, getting-off spot of the fellow passenger user, scheduled getting-off date and time of the fellow passenger user, type of the vehicle 10, attribute of the driver user, attribute of the fellow passenger user).

When the information indicating agreement to the provisional combination is replied from each user terminal 200A or 200B of the driver user or the fellow passenger user included in the provisional combination to the server apparatus 300, the matching processing unit F310 confirms the provisional combination as an official combination. Accordingly, the matching processing unit F310 generates a reservation information table as illustrated in aforementioned FIGS. 7 and 8 based on the official combination and stores the generated reservation information table in the reservation management database D330. Note that when the information indicating agreement to the provisional combination is not successfully received from each user terminal 200A or 200B of the driver user and the fellow passenger user (information indicating disagreement to the provisional combination is received from at least one of the user terminals 200 of the driver user or the fellow passenger users included in the provisional combination), the matching processing unit F310 performs the matching processing over again by resetting a new provisional combination composed of a combination of users different from the provisional combination.

(System Operation)

An operation flow of the ride sharing system according to the present embodiment will be described. FIG. 10 is a diagram illustrating the operation flow of the ride sharing system according to the present embodiment. FIG. 10 is a flowchart illustrating an overview of a flow of data transmitted/received among the respective components in ride sharing and a processing flow carried out in each component.

In FIG. 10, upon receiving an input of a traveling schedule (vehicle ID, driver user ID, place of departure, scheduled departure date and time, destination and scheduled arrival date and time) by the driver user to the input unit 205 (S11), the first user terminal 200A transmits the traveling schedule from the communication unit 206 to the server apparatus 300 as request information (S12).

When the communication unit 304 of the server apparatus 300 receives the request information from the first user terminal 200A, the matching processing unit F310 generates a traveling schedule information table as shown in aforementioned FIG. 5 based on the request information and registers the generated traveling schedule information table in the traveling schedule management database D310 (S13).

Upon receiving an input of a movement schedule (fellow passenger user ID, desired getting-in spot, desired getting-in date and time, desired getting-off spot, desired getting-off date and time, baggage attribute information) by the fellow passenger user to the input unit 205 (S14), the second user terminal 200B transmits the movement schedule from the communication unit 206 to the server apparatus 300 as request information (S15).

When the communication unit 304 of the server apparatus 300 receives the request information from the second user terminal 200B, the matching processing unit F310 generates a movement schedule information table as shown in aforementioned FIG. 6 based on the request information and registers the generated movement schedule information table in the movement schedule management database D320 (S16).

Note that the method for each user to have the above request information registered in the server apparatus 300 is not limited to the method using the user terminals 200A, 200B. For example, the above request information may also be registered in the server apparatus 300 using an arbitrary terminal connectable to the network N1 (smartphone, mobile phone, tablet terminal, personal information terminal, wearable computer or the like) or a personal computer (PC). Furthermore, in the example shown in FIG. 10, the request information from the first user terminal 200A is transmitted to the server apparatus 300 earlier than the request information from the second user terminal 200B, but the request information from the second user terminal 200B may also be transmitted to the server apparatus 300 earlier than the request information from the first user terminal 200A.

The matching processing unit F310 of the server apparatus 300 compares the traveling schedule information table stored in the traveling schedule management database D310 with the movement schedule information table stored in the movement schedule management database D320 and extracts a traveling schedule that matches the movement schedule of each fellow passenger user. Next, the matching processing unit F310 provisionally combines the driver user associated with the extracted traveling schedule with the fellow passenger user (S17).

The matching processing unit F310 transmits information inquiring whether or not to agree (agreement confirmation information) to the ride sharing conditions (getting-in spot of the fellow passenger user, scheduled getting-in date and time of the fellow passenger user, getting-off spot of the fellow passenger user, scheduled getting-off date and time of the fellow passenger user, attribute of the fellow passenger user or the like) and baggage attribute information of baggage carried by all the fellow passenger users included in the provisional combination determined in S17 to the first user terminal 200A used by the driver user included in the provisional combination determined in S17 from the communication unit 304 (S18).

When the first user terminal 200A of the driver receives the agreement confirmation information and the baggage attribute information, the first user terminal 200A displays the information indicating the ride sharing conditions with the provisional combination and the baggage attribute information of the display unit 204. In that case, the first user terminal 200A performs processing of urging each user to select whether or not to agree to the ride sharing conditions (e.g., processing of causing the input unit 205 such as a touch panel to display a button for selecting whether or not to agree to the ride sharing conditions). Thus, the driver user uses the baggage attribute information of the baggage carried by the fellow passenger user included in the provisional combination as a reference, and can thereby determine whether or not to agree to the ride sharing conditions. For example, the driver user can determine whether or not to load baggage of all the fellow passenger users into the loadable space of the vehicle 10 by taking into account the size of the baggage carried by all the fellow passenger users included in the provisional combination and the size of the loadable space of the vehicle 10 driven by himself/herself. Accordingly, upon determining that baggage of all the fellow passenger users included in the provisional combination is unable to be loaded into the loadable space of the vehicle 10, the driver user can determine to disagree to the ride sharing conditions. Note that the "loadable space" referred to here is not a loading space (baggage chamber) based on specifications of the vehicle 10, but, for example, a vacant space where no baggage of the driver user himself/herself is loaded or a seating space where baggage can be loaded, among loading spaces based on the specifications of the vehicle 10. Thus, when the total size of the baggage carried by all the fellow passenger users included in the provisional combination is larger than the size of the loadable space of the vehicle 10, the driver user may determine to disagree to the ride sharing conditions. Furthermore, when the baggage carried by the fellow passenger user included in the provisional combination is of a type of baggage not desirable, for the driver user, to be loaded into the vehicle 10, the driver user can also determine to disagree to the ride sharing conditions. For example, when a fellow passenger user carrying baggage of a type physically or mentally not desirable for the driver user is included among the fellow passenger users included in the provisional combination (e.g., animal or plant inducing allergic reaction of the driver user or loading the baggage into the vehicle may cause the vehicle 10 to be soiled, such as outdoor goods or sporting goods), the driver user can determine to disagree to the ride sharing conditions.

Furthermore, the matching processing unit F310 transmits information (agreement confirmation information) inquiring whether or not to agree to the ride sharing conditions (getting-in spot of the fellow passenger user, scheduled getting-in date and time of the fellow passenger user, getting-off spot of the fellow passenger user, scheduled getting-off date and time of the fellow passenger user, type of the vehicle, attribute of the driver user or the like) from the communication unit 304 to the second user terminal 200B used by the fellow passenger user included in the provisional combination determined in S17 (S19). In that case, the second user terminal 200B displays information indicating the ride sharing conditions with the provisional combination on the display unit 204 and performs processing of urging the fellow passenger user to select whether or not to agree to the ride sharing conditions.

When each user selects to agree to the ride sharing conditions on each user terminal 200A or 200B, each user terminal 200A or 200B transmits information (agreement information) indicating agreement to the ride sharing conditions with the provisional combination from the communication unit 206 to the server apparatus 300 (S20, S21). Note that in the example illustrated in FIG. 10, the agreement information from the first user terminal 200A is transmitted to the server apparatus 300 earlier than the agreement information from the second user terminal 200B, but the agreement information from the second user terminal 200B can also be transmitted earlier than the agreement information from the first user terminal 200A.

When the communication unit 304 of the server apparatus 300 receives agreement information from both the first user terminal 200A and the second user terminal 200B, the matching processing unit F310 confirms the provisional combination as an official combination (S22). The matching processing unit F310 generates a reservation information table as illustrated in aforementioned FIGS. 8 and 9 based on the ride sharing conditions with the official combination and registers the generated reservation information table in the reservation management database D330 (S23). Furthermore, the matching processing unit F310 transmits the information (reservation information) included in the generated reservation information table to the first user terminal 200A and the second user terminal 200B (S24).

Note that when the agreement information can be received neither from the first user terminal 200A nor from the second user terminal 200B, the matching processing unit F310 of the server apparatus 300 is assumed to reset a new provisional combination composed of a combination of users different from the provisional combination.

Next, operation of the server apparatus 300 according to the present embodiment will be described based on FIG. 11. FIG. 11 is a flowchart illustrating operation of the server apparatus when the server apparatus receives the request information from the user terminal 200A or 200B.

In FIG. 11, when the server apparatus 300 receives the request information transmitted from the user terminal 200 (step S101), the matching processing unit F310 of the server apparatus 300 sets a provisional combination of the driver user and the fellow passenger user based on the request information (step S102). In that case, when the request information received in step S101 is transmitted from the second user terminal 200B used by the fellow passenger user, the matching processing unit F310 extracts a traveling schedule that matches the movement schedule of the fellow passenger user and provisionally combines the driver user associated with the extracted traveling schedule with the fellow passenger user. Furthermore, when the request information received in step S101 is from the first user terminal 200A used by the driver user, the matching processing unit F310 extracts a movement schedule that matches the traveling schedule of the vehicle 10 driven by the driver user and provisionally combines the fellow passenger user associated with the extracted movement schedule with the driver user.

When the provisional combination of the driver user and the fellow passenger user is set in above step S102, the matching processing unit F310 acquires attribute information of the baggage carried by the fellow passenger user included in the provisional combination (step S103). More specifically, the matching processing unit F310 accesses the movement schedule information table associated with the fellow passenger user, reads the baggage attribute information registered in the baggage attribute information field of the movement schedule information table and thereby acquires the baggage attribute information of the baggage carried by the fellow passenger user.

The matching processing unit F310 transmits the aforementioned agreement confirmation information and the baggage attribute information acquired in step S103 from the communication unit 304 to the first user terminal 200A used by the driver user included in the provisional combination (step S104). The first user terminal 200A that receives such agreement confirmation information and baggage attribute information displays information indicating the ride sharing conditions with the provisional combination and the baggage attribute information of the display unit 204 as described above, and performs processing of urging the driver user to select whether or not to agree to the ride sharing conditions. Thus, the driver user included in the provisional combination uses the baggage attribute information as a reference, and can thereby determine whether or not to agree to the ride sharing conditions with the provisional combination.

The matching processing unit F310 transmits solely the aforementioned agreement confirmation information to the second user terminal 200B used by the fellow passenger user included in the provisional combination (step S105). The second user terminal 200B that receives such agreement confirmation information displays information indicating the ride sharing conditions with the provisional combination on the display unit 204 as described above, and performs processing of urging the fellow passenger user to select whether or not to agree to the ride sharing conditions.

When the server apparatus 300 receives information transmitted from the respective user terminals 200 of the driver user and the fellow passenger user included in the provisional combination in the form of responding to the agreement confirmation information, the matching processing unit F310 decides whether or not agreements on the provisional combination have been obtained from both the driver user and the fellow passenger user (step S106). In that case, if information indicating agreement to the provisional combination has been received from both the user terminals 200A and 200B of the driver user and the fellow passenger user included in the provisional combination, this means that agreements on the provisional combination have been obtained from both the driver user and the fellow passenger user (affirmative decision in step S106), and so the matching processing unit F310 confirms the provisional combination as the official combination (step S107). The matching processing unit F310 then generates a reservation information table corresponding to the official combination and registers the generated reservation information table in the reservation management database D330. Furthermore, the matching processing unit F310 transmits reservation information included in the reservation information table to the respective user terminals 200A and 200B of the driver user and the fellow passenger user included in the official combination (step S108).

Note that when agreements on the provisional combination have not been obtained from both the driver user and the fellow passenger user, that is, information indicating agreement to the provisional combination has not successfully been received from both the user terminals 200A and 200B of the driver user and the fellow passenger user included in the provisional combination (negative decision in step S106), the matching processing unit F310 returns to above step S102 and performs the matching processing over again. In that case, the matching processing unit F310 is assumed to set a new provisional combination composed of a combination of users different from the provisional combination. This prevents an inappropriate combination of the driver user and fellow passenger user from being set.

According to the aforementioned processing flow, the driver user included in the provisional combination uses baggage attribute information of the baggage carried by the fellow passenger user included in the provisional combination as a reference, and can thereby grasp attributes of baggage of all the fellow passenger users included in the provisional combination in advance. Thus, the driver user can determine whether or not to agree to the provisional combination by taking into account whether or not it is possible to load baggage of all the fellow passenger users included in the provisional combination into the vehicle driven by himself/herself. That is, the driver user can determine whether or not to agree to the provisional combination by taking into account not solely whether or not it is possible to allow the fellow passenger user himself/herself to ride in the vehicle driven by himself/herself but also whether or not it is possible to load the baggage carried by the fellow passenger user into the vehicle driven by himself/herself. Therefore, it is possible to prevent the driver user from being combined with a fellow passenger user carrying baggage unable to physically be loaded into the vehicle driven by himself/herself or a fellow passenger user carrying baggage not desirable to be loaded into the vehicle driven by himself/herself. As a result, it is possible to prevent the driver user from being inappropriately combined with fellow passenger users in ride sharing.

Note that a case can be assumed where the size and type of the baggage carried by the fellow passenger user may be changed after a combination of the driver user and fellow passenger users is confirmed. For example, when the fellow passenger user does shopping before getting in the vehicle 10 available for ride sharing, the number of pieces of baggage carried by the fellow passenger user may increase, which may change the size of the whole baggage or a new type of baggage may be added. In such a case, the fellow passenger user may transmit information relating to the changed size of the whole baggage or the type of baggage added from the second user terminal 200B used by the fellow passenger user himself/herself to the server apparatus 300. In such a case, the server apparatus may inquire of the user terminal of the fellow passenger user whether or not the baggage attribute has been changed at a stage before the vehicle driven by the driver user starts moving toward the getting-in spot of the fellow passenger user. The server apparatus 300 may transmit new baggage attribute information including the changed size of the whole baggage and the type of the added baggage and information inquiring whether or not to agree to the combination with the fellow passenger user to the first user terminal 200A used by the driver user. In this way, when the changed size of the whole baggage is larger than the size of the loadable space of the vehicle 10 or the added baggage is of a type of baggage not desired by the driver user, the driver user can transmit information indicating disagreement to the combination with the fellow passenger user from the first user terminal 200A used by himself/herself to the server apparatus 300. The matching processing unit F310 of the server apparatus 300 may then set a new combination different from the combination of the driver user and the fellow passenger users.

<Others>

Note that the above embodiments are merely examples and the present disclosure can be changed and implemented as appropriate without departing from the spirit and scope of range of the present disclosure.

The processes and means described in the present disclosure may be freely combined and implemented unless there are technical inconsistencies. A process described as being performed by one device may be shared and executed among a plurality of devices. Alternatively, processes described as being executed by different devices may be executed by one device. In a computer system, it is possible to flexibly change a hardware configuration used to implement each function.

Furthermore, the present disclosure can also be implemented by supplying a computer program including the functions described in the above embodiments to a computer and by one or more processors included in the computer reading and executing the program. Such a computer program may be supplied to the computer through a non-transitory computer readable storage medium which is connectable to a system bus of the computer or may be supplied to the computer via a network. The non-transitory computer readable storage medium is a storage medium which allows information such as data or a program to be stored through electrical, magnetic, optical, mechanical or chemical action and read from the computer or the like, and examples of such a medium include any type of disk such as magnetic disk (floppy (registered trademark) disk, hard disk drive (HDD) or the like), optical disk (CD-ROM, DVD disk, blue-ray disk or the like), read-only memory (ROM), random access memory (RAM), EPROM, EEPROM, magnetic card, flash memory, optical card and SSD (Solid State Drive).

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. An information processing server that sets a combination of a driver user who drives a vehicle and a passenger user who rides in the vehicle, the information processing server comprising:
   a traveling schedule management database storing a traveling schedule of the vehicle driven by the driver user;
   a movement schedule management database storing a movement schedule of the passenger user and baggage attribute information which is information including a size and a type of baggage carried by the passenger user; and
   a controller including at least one processor, the controller being programmed to:
      set a provisional combination of the driver user and the passenger user by comparing the traveling schedule stored in the traveling schedule management database and the movement schedule stored in the movement schedule management database;
      acquire the baggage attribute information which is information including the size and the type of baggage carried by the passenger user included in the provisional combination from the movement schedule management database;
      transmit the baggage attribute information of the baggage carried by the passenger user included in the provisional combination and information inquiring whether or not to accept the provisional combination, to a terminal used by the driver user included in the provisional combination;
      instruct the terminal used by the driver user to display the baggage attribute information and the information inquiring whether or not to accept the provisional combination;
      receive a response from the terminal used by the driver indicating whether the baggage carried by the passenger user is acceptable to the driver and whether the provisional combination is acceptable, and store the response; and
      automatically set the provisional combination as an official combination when the stored response indicates that the baggage carried by the passenger user is acceptable and that the provisional combination is acceptable,
   wherein the type of baggage indicates to the driver user whether the baggage is physically or mentally not desirable for transportation.

2. The information processing server according to claim 1, wherein when to the stored response does not indicate that the provisional combination is acceptable, the controller is programmed to reset a new provisional combination composed of a combination of the driver user and passenger user different from the provisional combination.

3. An information processing method for setting a combination of a driver user who drives a vehicle and a passenger user who rides in the vehicle, the information processing method causing a server to execute:
   a step of setting a provisional combination of the driver user and the passenger user by comparing a traveling schedule stored in a traveling schedule management database which is provided with the server and a movement schedule stored in a movement schedule management database which is provided with the server;
   a step of acquiring baggage attribute information which is information including a size and a type of baggage carried by the passenger user included in the provisional combination from the movement schedule management database;
   a step of transmitting the baggage attribute information of the baggage carried by the passenger user included in the provisional combination and information inquiring whether or not to accept the provisional combination to a terminal used by the driver user included in the provisional combination;
   a step of instructing the terminal used by the driver user to display the baggage attribute information and the information inquiring whether or not to accept the provisional combination;
   a step of receiving a response from the terminal used by the driver indicating whether the baggage carried by the passenger user is acceptable to the driver and whether the provisional combination is acceptable, and storing the response; and
   a step of automatically setting the provisional combination as an official combination when the stored response indicates that the baggage carried by the passenger user is acceptable and that the provisional combination is acceptable,
   wherein the type of baggage indicates to the driver user whether the baggage is physically or mentally not desirable for transportation.

4. A non-transitory computer readable storage medium storing an information processing program for setting a combination of a driver user who drives a vehicle and a passenger user who rides in the vehicle, the information processing program causing a server to execute:
   a step of setting a provisional combination of the driver user and the passenger user by comparing a traveling schedule stored in a traveling schedule management database which is provided with the server and a movement schedule stored in a movement schedule management database which is provided with the server;
   a step of acquiring baggage attribute information which is information including a size and a type of baggage carried by the passenger user included in the provisional combination from the movement schedule management database;
   a step of transmitting the baggage attribute information of the baggage carried by the passenger user included in the provisional combination and information inquiring whether or not to accept the provisional combination to a terminal used by the driver user included in the provisional combination;

a step of instructing the terminal used by the driver user to display the baggage attribute information and the information inquiring whether or not to accept the provisional combination;

a step of receiving a response from the terminal used by the driver indicating whether the baggage carried by the passenger user is acceptable to the driver and whether the provisional combination is acceptable, and storing the response; and a step of automatically setting the provisional combination as an official combination when the stored response indicates that the baggage carried by the passenger user is acceptable and that the provisional combination is acceptable, wherein the type of baggage indicates to the driver user whether the baggage is physically or mentally not desirable for transportation.

* * * * *